Aug. 19, 1930.  S. F. BAUWENS  1,773,510
MACHINE FOR USE IN MAKING BOXES
Filed Feb. 2, 1924  9 Sheets-Sheet 1

INVENTOR.
Seraphine P. Bauwens
BY Edward Dunne Jr.
ATTORNEY

Aug. 19, 1930.  S. F. BAUWENS  1,773,510
MACHINE FOR USE IN MAKING BOXES
Filed Feb. 2, 1924   9 Sheets-Sheet 3

INVENTOR.
Seraphine F. Bauwens
BY Edward Dunne Jr.
ATTORNEY.

Aug. 19, 1930. S. F. BAUWENS 1,773,510
MACHINE FOR USE IN MAKING BOXES
Filed Feb. 2, 1924    9 Sheets-Sheet 4

Aug. 19, 1930.　　　S. F. BAUWENS　　　1,773,510
MACHINE FOR USE IN MAKING BOXES
Filed Feb. 2, 1924　　　9 Sheets-Sheet 7

INVENTOR.
Seraphine F. Bauwens
BY Edward Dunne Jr.
ATTORNEY.

Patented Aug. 19, 1930

1,773,510

UNITED STATES PATENT OFFICE

SERAPHINE F. BAUWENS, OF CHICAGO, ILLINOIS, ASSIGNOR TO WIREBOUNDS PATENTS COMPANY, A CORPORATION OF MAINE

MACHINE FOR USE IN MAKING BOXES

Application filed February 2, 1924. Serial No. 690,170.

My invention relates to box or crate stapling machines and particularly to machines for securing ends or heads to a box or crate. Certain features of the invention, as defined in the claims, may be used to advantage in box blank machines and in wirebound box blank machines.

Among other objects, my invention is intended to provide an improved box-stapling machine; to provide a box-stapling machine having mechanism for forming and driving center-pointed staples; to provide a box-stapling machine having a plurality of stapling heads operable within a box or crate and close to sides thereof; to provide a box end stapling machine with improved means for positioning the box or crate and its end or head during stapling operations; and to provide a box end stapling machine with means for feeding a box or crate and its end or head between stapling operations, including means to control the feed movements of the work to locate staples in the work.

The machine selected for illustration is designed to receive and position a cleat-reinforced box or crate and its end or head, and to fasten the end or head to the cleats by forming staples within the box or crate and driving the same upward through the end or head into the cleats.

It will be understood, however, that certain features of the invention, such, for example, as the staple forming and driving mechanism, may be used to advantage in other types of machines, such, for example, as box blank machines and wirebound box blank machines.

The illustrative machine consists generally of staple-forming and driving mechanism operable within a box or crate and close to the sides thereof to form staples out of staple stock wire automatically fed thereto and to drive the same through the end or head and into cleats of the box or crate. Means are provided to position the box or crate and its end or head during the stapling operations, to feed the work between stapling operations, to clinch staples which may be driven through the cleats, and to form center-pointed staples.

The several means and their operating mechanisms are supported by body frames 1 connected by a tie-rod 2 and tie-bar 3.

The staple-forming and driving units, of which there are two, are carried by stapler arms 4 which are supported by tie-rod 2 and tie-bar 3, the upper rear end of said arms being provided with bearings 5 to receive tie-rod 2 and the lower rear end of said arms being provided with a foot 6 to engage tie-bar 3. Stapler arms 4 are relatively adjustable along tie-rod 2 and tie-bar 3 to accommodate boxes or crates of different size and may be secured in any desired position along tie-rod 2 by set screws 7.

The mechanism for clamping the work and clinching the staples is carried by two arms 8 bolted to upward extensions 9 of arms 4 so that a clamping and clinching mechanism is provided directly above each staple-forming and driving unit carried by arms 4.

The staple stock wire 10 for each stapling unit is carried by a reel 11 on a shaft 12 supported by brackets 50 bolted to frame 1, and is fed through a tube 15 to the staple-forming mechanism at the nose of arm 4 by feed rollers 13 and 14 mounted on stud shafts secured to arm 4. The staple-forming and driving mechanism, which is located at the nose of each arm 4, consists of a staple-former 16 having a cutting edge 17, a loop bar 18 about which the staple is bent by the staple-former, and a driver 19 to drive the staple from the staple-former upward into the work. The staple-forming and driving mechanism as thus far described is well known and, therefore, need not be described in detail, it being sufficient here to say that the proper length of staple stock wire 10 for a staple is fed over the staple-former 16 and beneath the loop bar 18. The staple-former is then raised cutting off the wire between cutting edge 17 and a fixed cutter 20 bolted to arm 4 and bending the wire upward about the loop bar 18. When the formation of the staple is completed, the driver is raised forcing the loop bar 18 out of line and driving the staple out of the staple-former into the work. The parts are then returned to initial position and another length of wire is fed to position to be severed and formed into a staple. The staple-former and driver are raised and lowered by a rack-plate 52 meshing with a sector gear 51 which is rocked by a reciprocating arm 53 through a lever 54 pivoted to the side of arm 4; said arm 53 being supported at one end by lever 54 and at the other end by a lever 59. Lever 59, which is the same size as lever 54, is pivoted at one end to arm 53 and at the other end to the side of arm 4.

Heretofore, staples formed from staple stock wire by the staple-forming mechanism just described, by reason of the manner in which the wire was severed by the cutters 17 and 20, were inclined to spread when driven into the box materials. This spreading limited the length of staples which could be driven. I have, therefore, provided mechanism operable upon the staple stock wire before it reaches the staple-forming and driving mechanism proper, whereby center-pointed staples may be formed.

Figure 9:
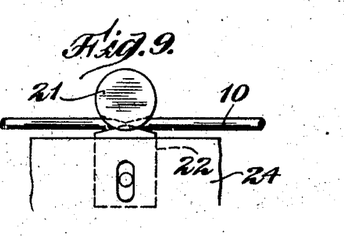
Figs. 9 and 10 are enlarged detailed views of the mechanism for pointing the staples, Fig. 9 being a side elevation of the forming dies between which the staple wire is pointed and Fig. 10 being a plan view of the under side of the stationary die.
Figure 10:
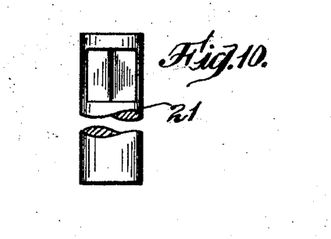

The mechanism for forming center-pointed staples is best shown in Figs. 2 and 7 to 10 inclusive, and comprises a stationary forming die 21 fixed by a set screw 23 in a plate secured to arm 4 and a movable forming die 22 reciprocable vertically in a plate 24 bolted to arm 4, the arrangement being such that the wire passes between said dies and in position to be squeezed between them when movable die 22 is forced upward against stationary die 21. The forming dies are so formed as to indent the wire on either side thereof, as shown in Fig. 9.

Figure 12:
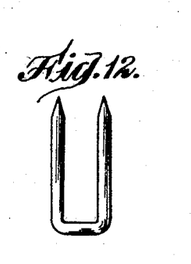
Fig. 12 is an enlarged perspective view of a chisel-pointed staple which may be made on the illustrative machine.
Figure 13:
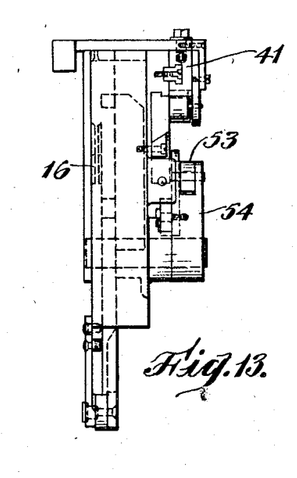
Fig. 13 is an end view of the stapling arm seen from the line 13—13 of Fig. 3; the loop bar of the staple-forming mechanism being left out for clearness of illustration.
Figure 14:
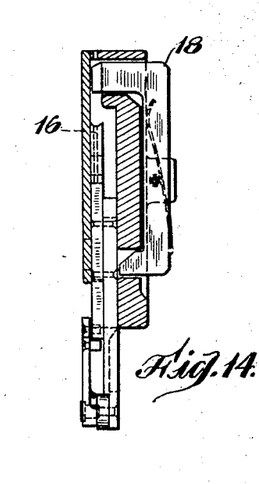
Fig. 14 is a sectional view of the staple-forming and driving mechanism taken on the line 14—14 of Fig. 3.
Figure 15:
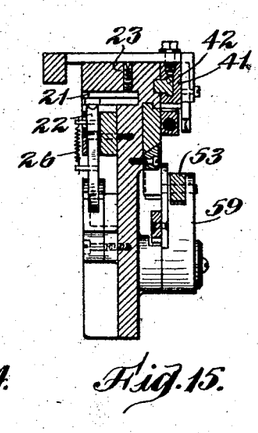
Fig. 15 is a sectional view taken on the line 15—15 of Fig. 3.
Figure 16:
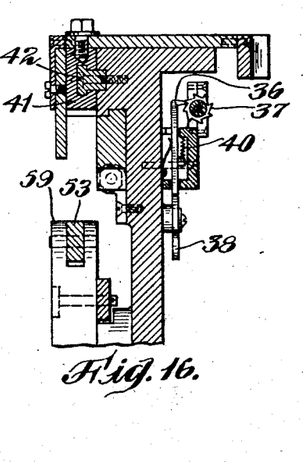
Fig. 16 is a sectional view taken on the line 16—16 of Fig. 2.
Figure 17:
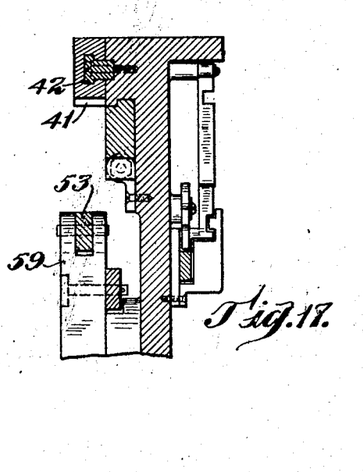
Fig. 17 is a sectional view taken on the line 17—17 of Fig. 2.
Figure 18:
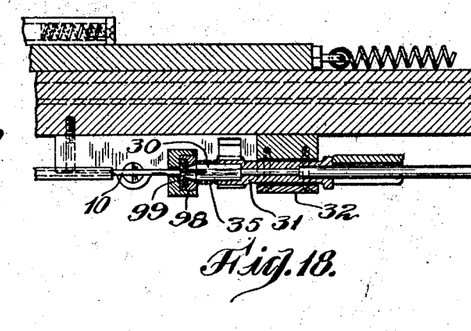
Fig. 18 is a sectional view taken on the line 18—18 of Fig. 2.

The mechanism just described may be employed to form a chisel-pointed staple in the following manner: The wire is held stationary while the movable die 22 is forced upward toward stationary die 21 a sufficient number of times (five in the illustrative machine) to indent the wire on either side without, however, completely severing the wire but leaving sufficient attachment to feed the wire forward to the staple-forming mechanism proper where the thin attachment at the point of indentation is severed by the cutters 17 and 20, thus producing the chisel-point shown in Fig. 12. The mechaism for forming chisel-pointed staples is claimed in my co-pendng divisional applicaton, Sr. No. 146,498, filed November 5, 1926.

Figure 11:
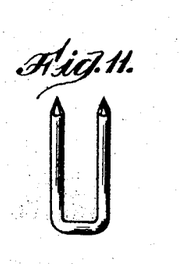
Fig. 11 is an enlarged perspective view of a center pointed staple made on the illustrative machine.

To form a center-pointed staple, the wire 10 is given a fifth of a revolution between reciprocations of movable die 22, thus presenting different portions of the wire to the action of the forming dies and forming a rounded or many-sided indenture which is subsequently completely severed by the cutters 17 and 20 to form the round point shown in Fig. 11.

Movable forming die 22 is driven upward toward stationary forming die 21 by a toggle 25, the upper end of which is held in an opening in plate 24 and contacts with the lower end of die 22. The lower end of toggle 25 is pivoted to the side of stapler arm 4. Die 22 is held in contact with the upper end of toggle 25 by a spring 26. Toggle 25 is operated by an arm 27 carried by a rod 28, which arm and rod are reciprocable in plates bolted to the side of stapler arm 4. A spring 29 keeps toggle 25 in contact with arm 27.

For revolving wire 10 to form the center-pointed staples, mechanism is provided to grip the wire and revolve it a portion of a revolution between operations of the toggle 25. Such mechanism consists of a split chuck 30 supported in a sliding sleeve 31 mounted in a plate 32 bolted to plate 24, means for operating said split chuck to grip the wire, and ratchet means for revolving said split chuck to present different portions of the wire 10 to the action of the forming dies 21 and 22.

Split chuck 30 is caused to close upon and grip the wire 10 when it is forced into a cone shaped collar 98 which is provided with ball bearings 99 to facilitate rotation of the chuck as hereinafter explained. Split chuck 30 is forced into cone shaped collar 98 by moving sleeve 31 to the left viewing Fig. 2. Sleeve 31 is moved to the left by an arm 33 pivoted at its upper end to the side of stapler arm 4 and the lower end of which lies in the path of travel of a cam plate 34 carried by arm 27. The arrangement is such that when arm 33 rides up on cam-plate 34, sleeve 31 is moved to the left viewing Fig. 2 and split chuck 30 is caused to grip wire 10. When cam-plate 34 is withdrawn from engagement with arm 33, a spring 35 moves sleeve 31 and arm 30 to the right, viewing Fig. 2, thus releasing split chuck 30 from its gripping engagement with the wire 10.

The mechanism for revolving split chuck 30 to make the round-pointed staple comprises a spring-pressed pawl 36 reciprocable vertically in plate 24 and operable at each upstroke to engage and move a ratchet 37 on sleeve 31. Pawl 36 is moved upward by a bell-crank lever 38 pivoted to arm 4, the upper end of said lever contacting with the lower end of pawl 36 and the lower end of said lever being in the path of travel of abutment 39 on arm 27 so that when arm 27 is moved to the left, viewing Fig. 2, as hereinafter explained, abutment 39 will engage and move bell-crank lever 38 thereby raising pawl 36 and revolving ratchet 37 and sleeve 31. Pawl 36 is returned to its lowermost position and bell-crank lever 38 is held in contact with abutment 39 by means of a spring 40. It will be understood that the mechanism for revolving sleeve 31 need not be incorporated in the machine if chisel-pointed staples are desired.

Figure 4:
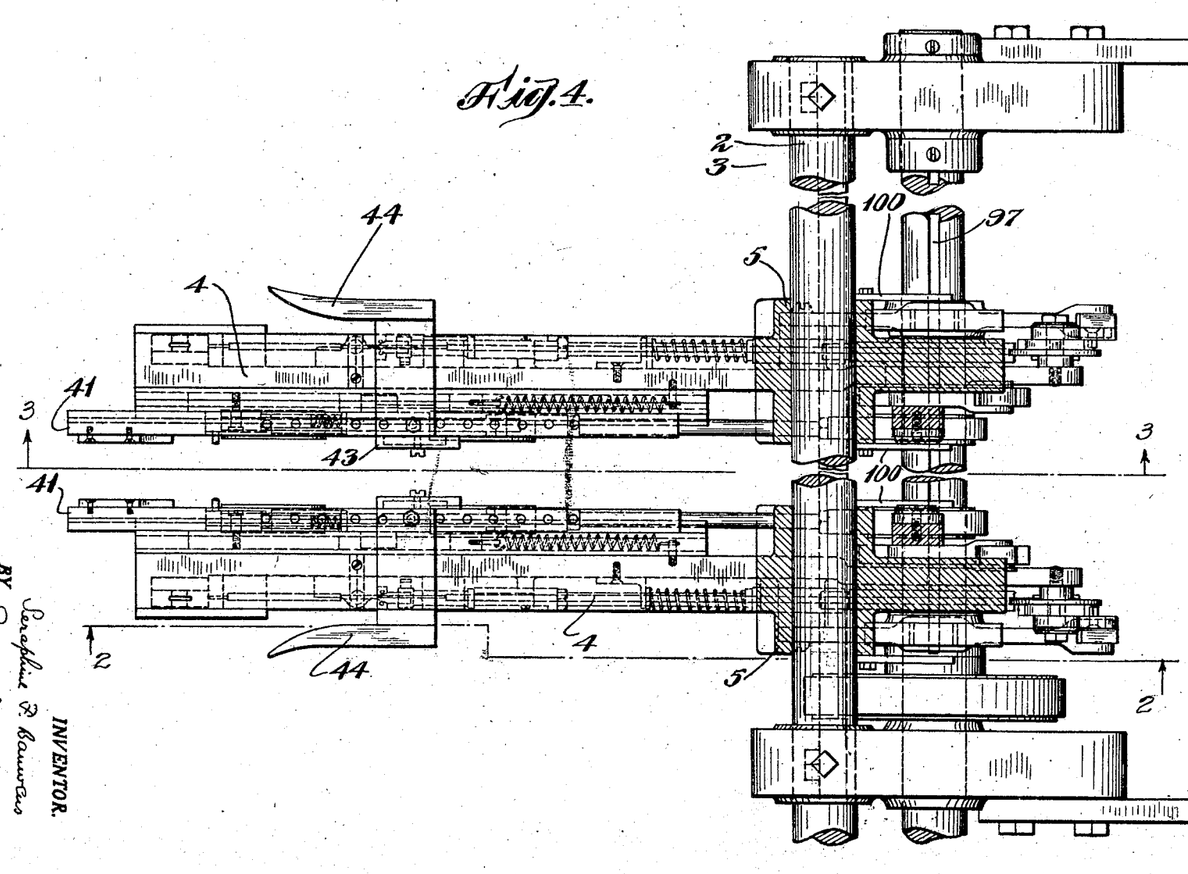
Fig. 4 is a sectional plan view taken on the line 4—4 of Fig. 2.
Figure 5:
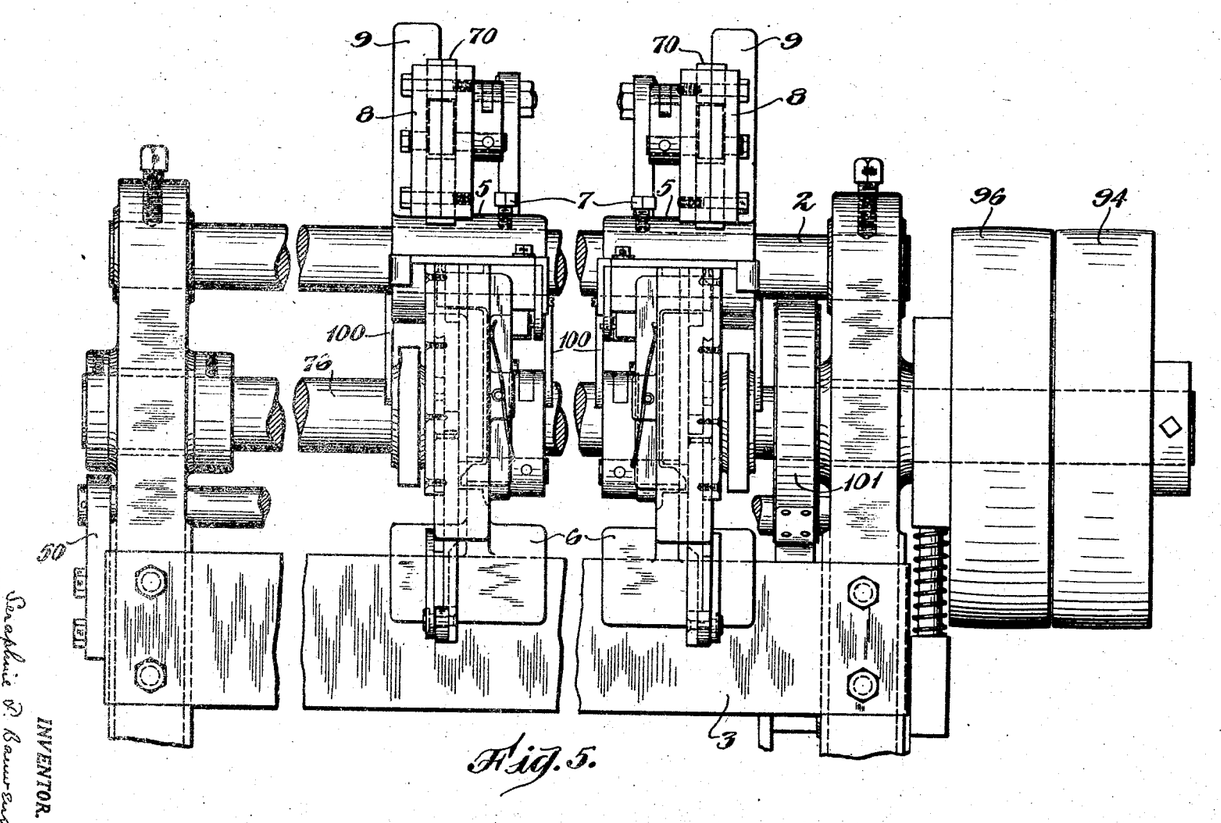
Fig. 5 is a front elevation of the machine.
Figure 6:
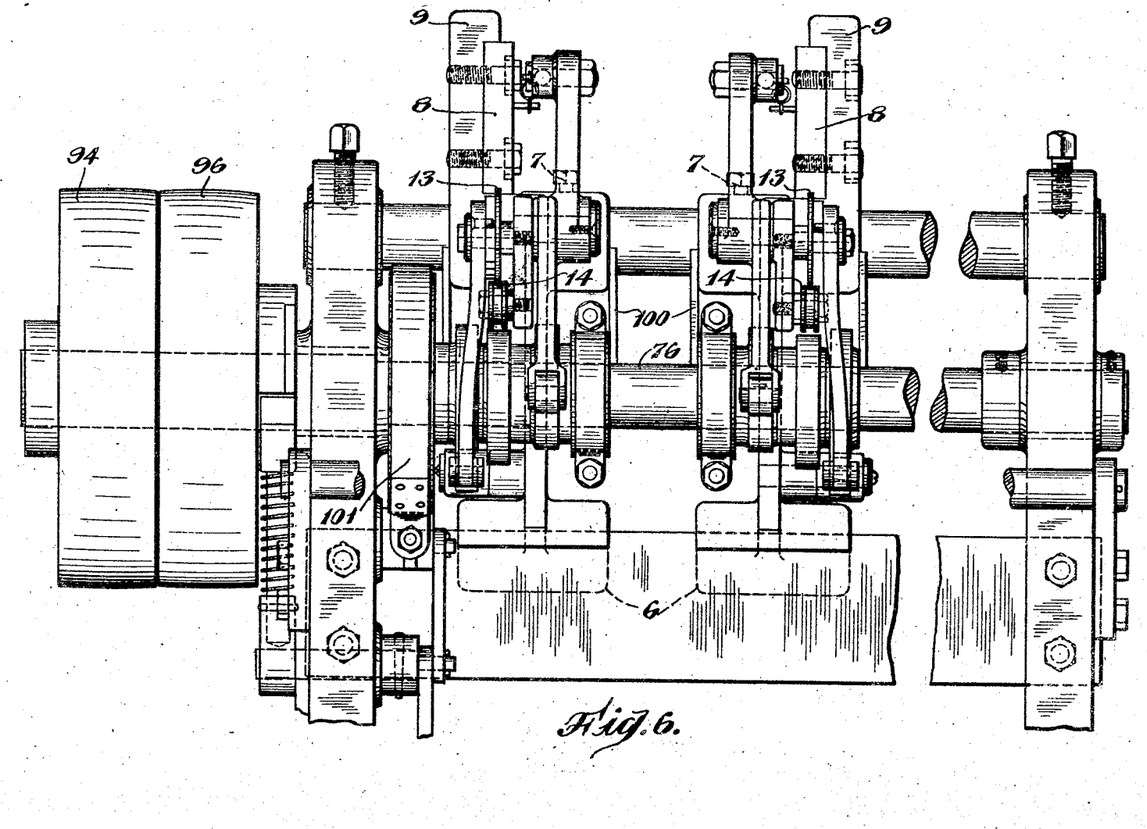
Fig. 6 is a rear elevation of the machine.
Figure 7:
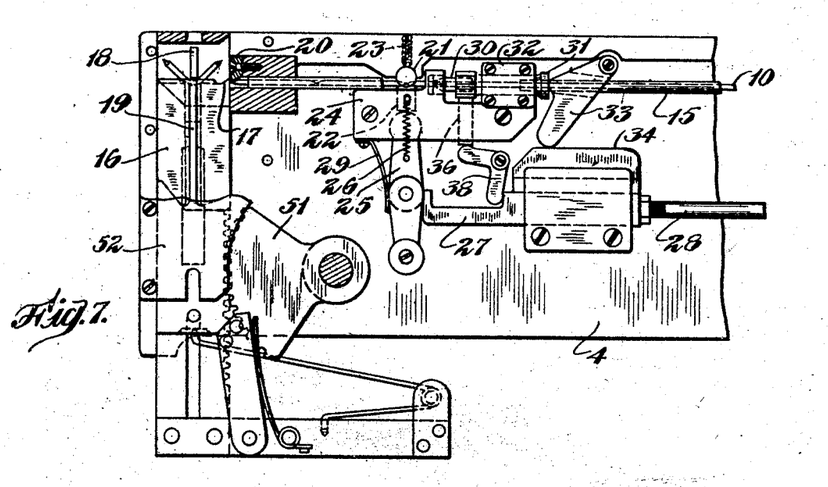
Figs. 7 and 8 are enlarged sectional side elevations of the staple-forming and driving mechanism in different phases of its operation.
Figure 8:
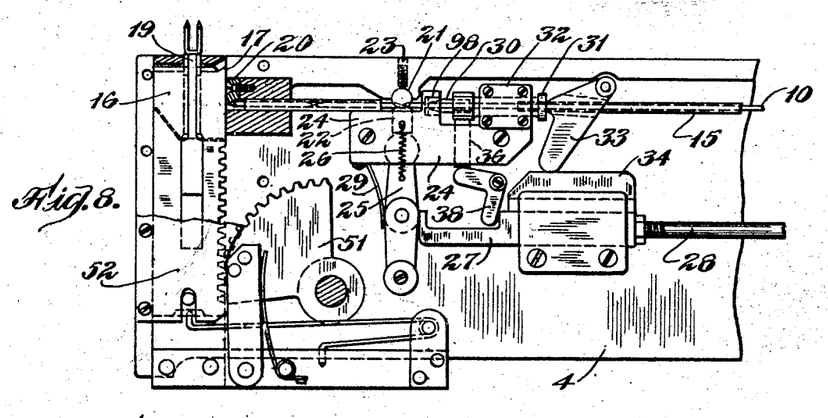

The box or crate and its end or head are positioned and fed on two feed bars 41, each supported by a stapler arm 4 and slidable along said arm on guide rails 42. Each bar 41 is provided with an adjustable stop plate 43 which may be secured by set screws at any point along said bar and against which the end or head of the box is positioned when placed on the bar 41 by the operator. The stop plates 43 each carry a positioning arm 44 formed as shown in Fig. 4, which arms force the box or crate sides into close contact with the end or head and hold the sides in said position during the work-feeding and stapling operations.

Figure 19:
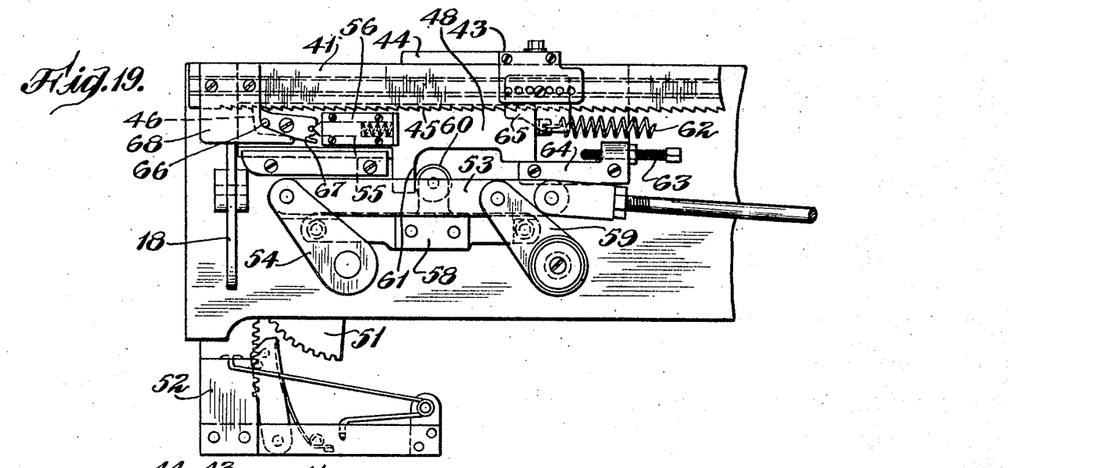
Figs. 19, 20 and 21 are sectional side elevations of the work-feeding mechanism showing the position of the parts during different phases of its operation.
Figure 20:
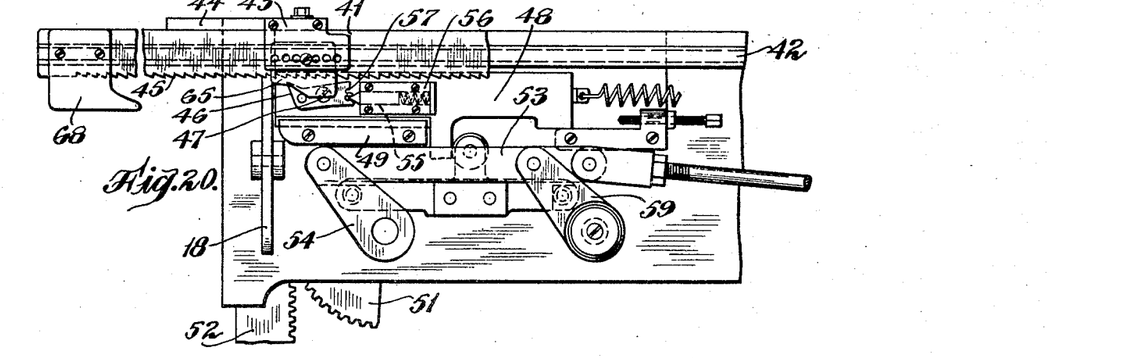
Figure 21:
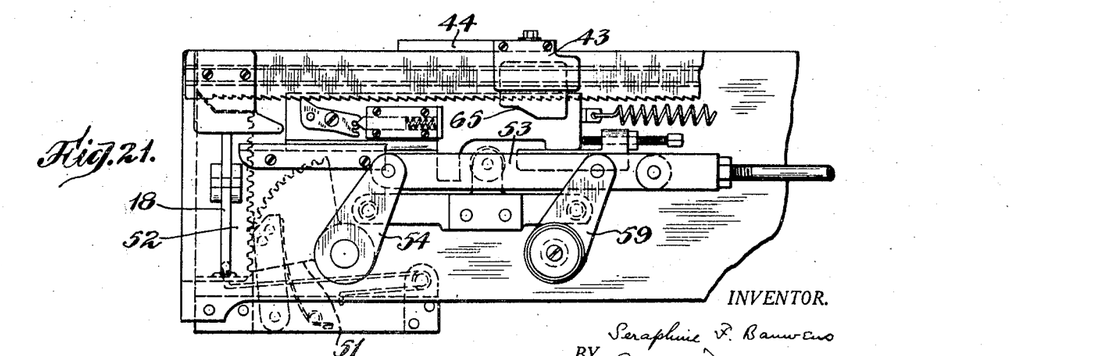

When the box or crate and its end or head are placed on the bars 41 by the operator, the bars 41 are in the extended position shown in Fig. 20, having reached this extended position upon completion of the stapling operation on the preceding box or crate. After placing the end or head of the box or crate on the bars 41, the operator pushes the bars 41 into the machine until the left-hand end of the bars 41, viewing Fig. 19, are flush with the ends of stapler arms 4.

When the bars 41 with the box or crate and its end or head positioned thereon have been pushed into the machine, the machine is started and the bars 41 carrying the work are automatically fed step-by-step out of the machine by the mechanism next described, the staple-forming and driving mechanism operating between feed steps to drive staples into the work.

Each bar 41 is fed out of the machine by mechanism carried by its supporting stapler arm 4 and, as the mechanisms on each arm are identical, a description of one will suffice, it being understood that the two feeding mechanisms are arranged to act in unison. Bar 41 is provided on its underside with rack teeth 45 which are engaged by a pawl 46 pivoted at 47 to a plate 48 reciprocable horizontally in guideways 49 bolted to arm 4. During the feeding of the bars 41 out of the machine, pawl 46 is held in engagement with rack teeth 45 by a spring-pressed plunger 55 carried by a casing 56 bolted to plate 48 and which engages a notch 57 in pawl 46. Plate 48 carrying pawl 46 is reciprocated by an arm 58 pivotally connected at one end to the lever 54 and at the other end to the lever 59, said arm 58 carrying a roller 60 which engages an extension 61 of the plate 48. Plate 48 is returned to the right, viewing Fig. 3, by a spring 62. The extent of movement of plate 48 and feed pawl 46 may be controlled by an adjustment screw 63 carried by a plate 64 bolted to arm 4. Thus the distance between staples may be controlled by adjusting screw 63, it being understood that a staple is driven between feed steps of the work and after the work comes to rest.

Mechanism is provided to disengage pawl 46 from rack teeth 45 upon completion of each box-ending operation so as to permit the operator to push bars 41 with the materials for the next box thereon back into the machine for the next box-ending operation. Said mechanism consists of a cam-plate 65 carried by adjustable stop-plate 43, which cam-plate 65 engages a pin 66 carried by pawl 46 and forces pawl 46 out of engagement with rack teeth 45. When cam-plate 65 engages and lowers pin 66, notch 57 in pawl 46 will be raised out of engagement with plunger 55, which plunger 55 will enter a notch 67 in pawl 46 and hold pawl 46 out of engagement with rack teeth 45 until pawl 46 is again forced into engagement with rack teeth 45 as next explained.

For moving pawl 46 into engagement with rack teeth 45 when the bars 41 have been pushed back into the machine by the operator, each bar 41 is provided with a cam-plate 68 adapted to engage and raise pin 66 on pawl 46, thus forcing pawl 46 into engagement with rack teeth 45, in which position the pawl is held by plunger 55 which enters notch 57 in the pawl 46. The engagement between cam-plate 68 and pin 66 also serves to prevent bars 41 from being pushed too far into the machine by the operator. Thus it will be seen that mechanism is provided automatically to associate the feed pawl with the rack teeth when the bars 41 have been pushed into the machine by the operator and to correctly position the work for the first stapling operation, and that mechanism is also provided to disassociate said pawl and said teeth when the bars have fed the ended box out of the machine.

The clamping and clinching mechanism which is carried by clincher arms 8 consists of a clincher anvil 70 slidable vertically in side plates 71 and operated by a sector gear 72 which meshes with gear teeth 73 cut in clincher anvil 70. Sector gear 72 which is journalled in side plates 71 is operated by a reciprocating rod 74 through a lever 75. The arrangement is such that the clincher anvil 70 is forced downward and held on the box parts during the staple-driving operation, thus clamping the box parts on the stapling arm 4 during the driving of the staple and clinching any staple legs which may be driven clear through the box parts.

The mechanisms hereinabove described for feeding staple stock wire, for forming and driving the staples, for forming chisel or center-pointed staples, for positioning and feeding the box parts, and for clamping the box parts and clinching the staples are all operated from a main drive shaft 76 journalled in supports 1.

Feed rollers 13 and 14 for feeding the staple stock wire are rotated intermittently by a ratchet 77 and a pawl 81, said ratchet and pawl mechanism being actuated by a cam 78 on shaft 76 acting on a roller 79 carried by an arm 80 pivoted to stapler arm 4 at one end and to the pawl 81 at the other end. A spring 82 holds roller 79 in contact with cam 78 and a spring 83 holds the pawl 81 in engagement with its ratchet wheel. The arrangement of the cam and ratchet and pawl mechanism is such that the proper length of staple stock wire to form a staple is fed to the staple-forming mechanism after the staple-former and driver have been lowered following a staple-forming and driving operation.

Figure 3:
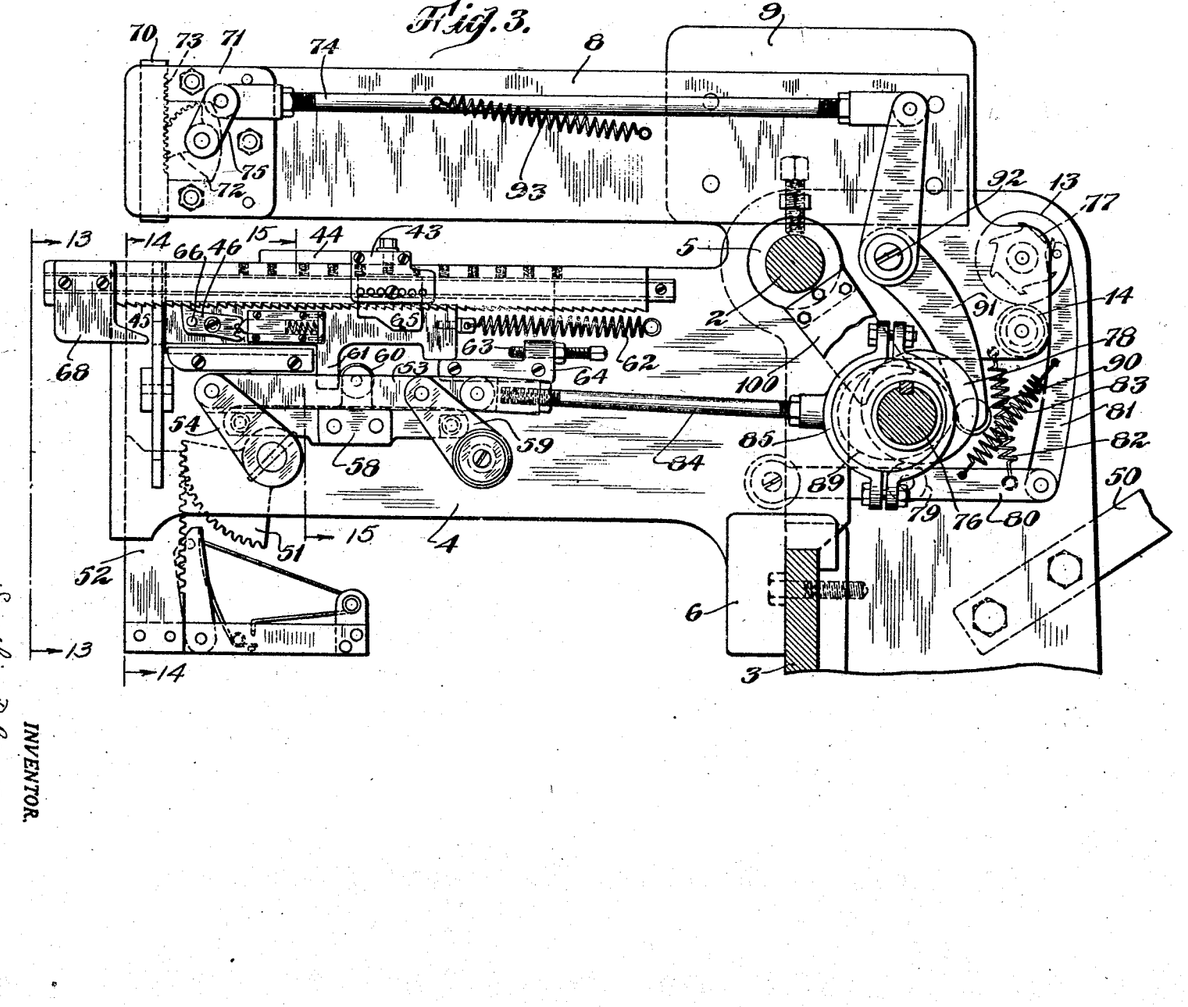
Fig. 3 is a sectional side elevation taken on the line 3—3 of Fig. 4.

Reciprocating arm 53, which through the train of mechanism hereinabove described operates the staple-forming and driving mechanism at the nose of stapler arm 4 and also the work-feeding mechanism, is operated by a pitman 84 from an eccentric 85 on shaft 76. As shown in Fig. 3, when arm 53 is moved to the left, the bars 41 carrying the work are moved forward a step and the staple-former and driver are lowered, and when the arm 53 is moved to the right, the bars 41 and the work remain stationary and the staple-former and driver are raised forming and driving a staple into stationary work.

Figure 2:
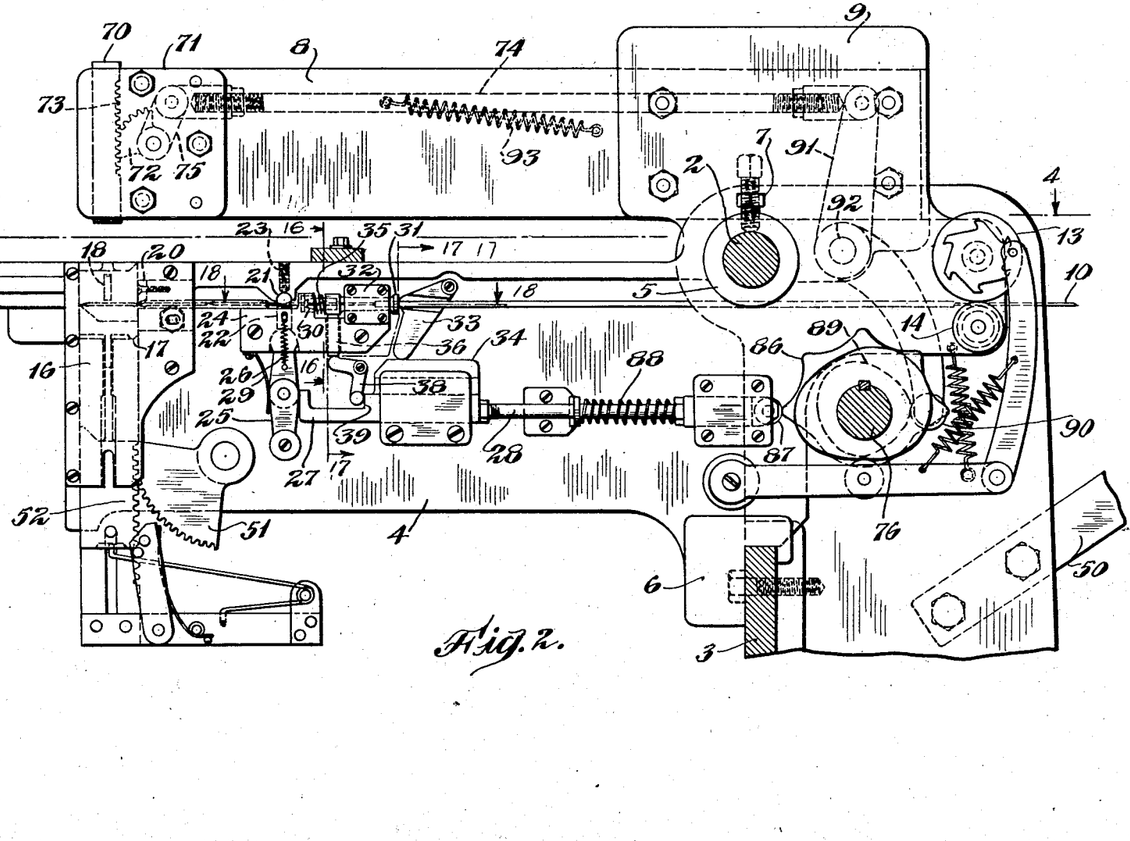
Fig. 2 is a sectional side elevation taken on the line 2—2 of Fig. 4: certain parts being broken away for clearness of illustration.

Rod 28, which operates the staple-pointing mechanism, is actuated by a cam 86 on shaft 76 which engages a roller 87 carried on the end of rod 28, as shown in Fig. 2. Roller 87 is pressed against cam 86 by a spring 88. It will be noted that cam 86 is designed to actuate the rod 28 five times per revolution of shaft 76, said five actuations occurring during approximately one-half a revolution of shaft 76. During the other half revolution of shaft 76, cam 86 permits spring 88 to hold rod 28 far enough to the right viewing Fig. 2, to release the grip of split chuck 30 on the staple stock wire so that wire for the next staple may be fed forward to the nose of arm 4.

Rod 74 which operates the clincher mechanism on arm 8 is actuated by a cam 89 acting on a roller 90 carried on the lower end of bell-crank lever 91 pivoted at 92 to the arm 4 and the upper end of which is pivotally secured to the end of rod 74. A spring 93 holds roller 90 in contact with cam 89.

Drive shaft 76 is driven from a drive pulley 94 which may be clutched to the drive shaft by a suitable clutch mechanism. In the illustrative machine, a clutch of the well known pin type is shown, which clutch is thrown in by stepping on a foot-pedal 95. A suitable brake 101 is also provided to stop shaft 76 when the clutch connection between said shaft and the drive pulley is broken, said brake being controlled by the foot pedal 95. An idler pulley 96 is provided to which the drive belt may be shifted when the machine is idle.

The operating cams and eccentrics on shaft 76 are shiftable thereon along a keyway 97 so that they may be shifted with arms 4 and 8 when said arms are shifted along tie-rod 2 in order to accommodate boxes or crates of different dimensions. To insure proper alignment between arms 4 and 8 and the cams and eccentrics which operate the mechanisms carried by said arms, plates 100 are secured to the opposite sides of arms 4, which plates extend down to the shaft 76 and maintain the cams and eccentrics in proper position on the shaft 76.

Figure 1:
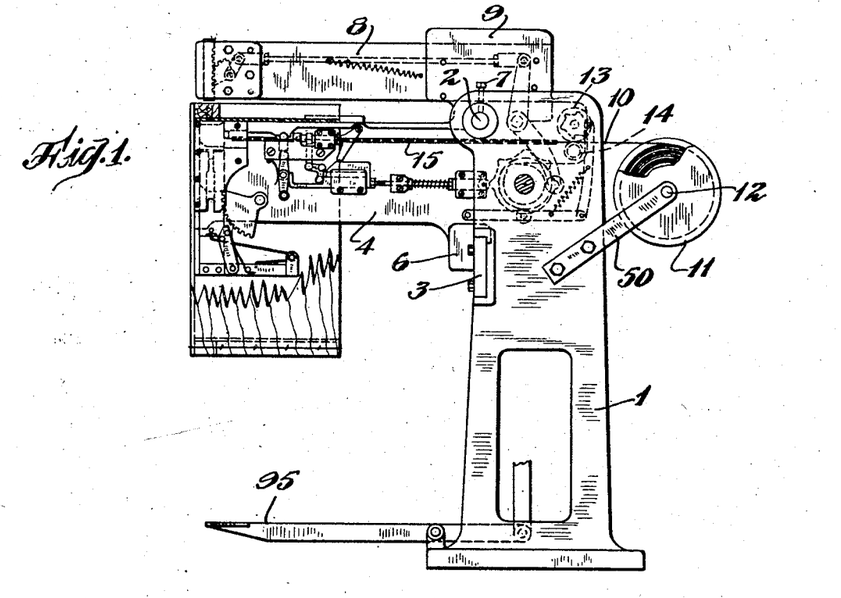
Fig. 1 is a side elevation partly in section of a box end stapling machine embodying the invention and showing a box and its end or head thereon in position to be acted upon by the machine.
Figure 22:
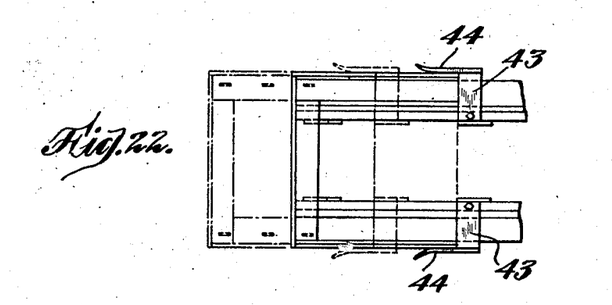
Fig. 22 is a top plan view of the stapling arms with a box and its end or head being operated upon; the full lines showing the position of the box when the machine is started and the dotted lines showing its position after the third staple has been driven.

The operation of the machine is as follows:
The operator first adjusts the two stapling arms the proper distance apart to accommodate the size of box or crate to be ended. That is, he spaces arms 4 such a distance apart that when the box to be ended is slipped over said arms, as shown in Figs. 1 and 22, the arms will contact with opposite inner faces of the box sides. He then adjusts stop plates 43 on bars 41 the proper distance from the end of said bars, that is, such a distance from the end of the bars that when an end is placed against the stops 43, the opposite extremity of the end will be flush with the ends of bars 41. He then adjusts screws 63 to control the extent of movement of the work between stapling operations and threads the staple stock wire in the usual and well known manner. With the parts in the position shown in Fig. 20, he places a box end on the bars 41 and against the stops 43 and wraps the box or crate around the end and the bars 41 pushing the box or crate up against the stops 43. During this operation the arms 44 position the sides of the box or crate in close contact with the sides of the bars 41 and then hold the box or crate in such position. The operator then pushes the bars 41 with the box materials positioned thereon into the machine until the plates 68 on the arms 41 contact with pins 66 carried by pawls 46 thereby stopping further movement of arms 41 and throwing pawls 46 into engagement with rack teeth 45. The parts are then in the position shown in Fig. 19. The operator then steps on foot-pedal 95 whereupon drive pulley 94 is clutched to drive shaft 76. Upon revolution of shaft 76, eccentrics 85 pull plates 53 to the right viewing Fig. 3 which cause sector gears 51 to operate the staple-formers and drivers each of which forms and drives a staple into the work. Movement of plates 53 to the right also moves pawls 46 to the right until they are stopped by the screws 63 contacting with plates 48. At the same time, cams 89 operate the clincher anvils 70 to clamp the work during the staple-driving operations. During the staple-driving operations and while the staple stock wire is stationary, cams 86 operate rods 88 which cause split chucks 30 to grip the wires and toggles 25 to operate movable dies 22 to indent the wires. At the same time, bell-crank levers 38 are causing pawls 36 to turn the wires between operations of movable dies 22. When movable dies 22 have been operated five times by the points on cams 86, the flat sides of said cams permit springs 88 to move rods 28 to the right viewing Fig. 2, thus releasing the staple stock wires from the grip of split chucks 30. Cams 78 then operate ratchet and pawl mechanisms 77 to feed forward staple stock wires for the next staples and eccentrics 85 move plates 53 to the left, viewing Fig. 3, which movement causes pawls 46 to feed bars 41 and the work into position to receive the next staples. This operation is repeated at each cycle of the drive shaft 76, the work being fed forward step-by-step by the reciprocating pawls 46 and a staple being driven at each side of the box between each feed step of the work. The step-by-step feed of the work continues until cam-plates 65 strike pins 66 on pawls 46 and throw the pawls out of engagement with rack teeth 45. The operator then takes his foot off foot-pedal 95 stopping the machine and removes the ended box from the bars 41 and places materials for the next ending operation thereon.

Applicant's invention has many advantages over prior art end stapling machines. The double head feature reduces the time required to end a box as the end is stapled to the cleats of both sides of the box at the same time. The mechanism for making chisel or center-pointed staples makes it possible to form and drive longer staples into the work, thus insuring a more secure attachment of the end to the cleats of the box or crate. The work-positioning and feeding mechanism, which automatically positions and feeds the work after it is pushed into the machine, makes it possible for the operator to prepare the next box and its end while the work in the machine is being operated upon. The automatic feed of the work also insures the driving of the requisite number of staples into the work the proper distances apart without any attention on the part of the operator. In prior art end stapling machines, it was necessary for the workman to position and feed the box and its end during the entire end stapling operation with the result that the character of the product was dependent almost entirely on the skill and attention of the operator. In applicant's machine, on the other hand, the operator simply places the materials on the work-holder and pushes the work-holder and materials into the machine, after which the machine holds the work in correct position and feeds it out of the machine without further attention on the part of the operator, thus eliminating all chance of defective product resulting from the carelessness or inefficiency of the operator.

Obviously, the invention is not limited to the specific construction and mode of operation hereinbefore described for illustration, nor is it indispensable that all features of the invention be used conjointly since they may be used to advantage in various combinations and sub-combinations as defined in the subjoined claims.

The expressions, "center-pointed", "center point" and "center points", as used in the specification and claims to define the character of staple point produced by the illustrative staple-forming mechanism, are intended to cover a staple point which is in substantial alignment with the longitudinal center axis of the staple wire, and said expressions are intended to include a staple point which is either substantially round in cross section or which has a plurality of flat, tapering sides, such, for example, as the staple point illustrated in Figs. 1 to 3, inclusive, of United States Patent to A. W. Parmelee, Number 362,530, dated May 10, 1887.

Reference is hereby made to my co-pending divisional applications, Serial No. 146,498. filed November 5, 1926, and Serial No. 146,808, filed November 6, 1926, which said divisional applications are directed to subjects matter disclosed but not claimed herein.

Claims:

1. A box-ending machine comprising fastener-setting mechanism operable within a box to secure an end thereto, and work-controlling means to position relatively the box sides and its end for a fastener-setting operation.

2. A box-ending machine comprising fastener-setting mechanism operable within a box to secure an end thereto, and work-controlling means to maintain a fixed relationship between box sides during fastener-setting operations.

3. A box-ending machine comprising fastener-setting mechanism operable within a box to secure an end thereto, and means to feed the box and its end to said mechanism.

4. A box-ending machine comprising fastener-setting mechanism operable within a box to secure an end thereto, and means to feed the box and its end between fastener-setting operations.

5. A box-ending machine comprising fastener-setting mechanism operable intermittently within a box to secure an end thereto, means to feed the box and its end between fastener-setting operations, and means to control the extent of such feed movements.

6. A box-ending machine comprising fastener-setting mechanism operable within a box to secure an end thereto, work-controlling means to position relatively the box sides and box end, and means to feed the box and its end between fastener-setting operations.

7. A box-ending machine comprising fastener-setting mechanism operable within a box to secure an end thereto, work-controlling means to position relatively the box sides and the end, means to feed the box and its end between fastener-setting operations, and means to control the extent of such feed movements.

8. A box-ending machine comprising staple-forming and driving mechanism operable within a box to form round-pointed staples from staple stock wire fed thereto and to drive the same into the box parts, and means to position and feed a box and its end to said mechanism.

9. A box-end-stapling machine comprising a plurality of staple-forming and driving mechanisms operable within a box to fasten an end thereto, and work-controlling means to position relatively the box sides and a box end during staple-driving operations.

10. A box-end-stapling machine comprising a pair of staple-forming and driving mechanisms operable within a box and close to opposite sides thereof to fasten an end thereto, and means to maintain a fixed relationship between the oppositely disposed box sides and the box end during staple-driving operations whereby the box end may be secured to opposite sides of the box simultaneously.

11. A box-end-stapling machine comprising a pair of staple-forming and driving mechanisms operable within a box and close to opposite sides thereof to fasten an end thereto, means to feed a staple stock wire to each of said mechanisms, and means operable upon said staple stock wire to form center-pointed staples.

12. A box-end-stapling machine comprising a pair of staple-forming and driving mechanisms operable within a box and close to opposite sides thereof to fasten an end thereto, and means to feed the box and its end to said mechanisms.

13. A box-end-stapling machine comprising a pair of staple-forming and driving mechanisms operable within a box and close to opposite sides thereof to fasten an end thereto, and means to position and feed the box and its end to said mechanisms.

14. A box-end-stapling machine comprising staple-forming and driving mechanism operable within a box and close to a side thereof to fasten an end thereto, means to feed staple stock wire to said mechanism, means to sever the staple stock wire, means to bend the severed portion into staple form, and means operable upon the staple stock wire at potential staple points prior to the severing operation to form center-pointed staples.

15. A box-end- stapling machine comprising staple-forming and driving mechanism operable within a box and close to a side thereof to fasten an end thereto, means to feed staple stock wire to said mechanism, means to indent the staple stock wire at potential staple points, means to sever the staple stock wire at said points, and means to bend the severed portion of said wire into staple form.

16. A machine for forming and driving staples comprising, in combination, means to feed staple stock wire, means to indent the staple stock wire at potential staple points, means to sever the staple stock wire at said points, means to bend the severed portion of said wire into staple form, and means to drive the staple.

17. A machine for use in making boxes comprising, in combination, means to feed box parts, and means to form a staple having center points and drive the staple into the box parts.

18. A machine for use in making boxes comprising, in combination, means to feed box parts intermittently, and means to form staples having center points and drive them at intervals into the box parts.

19. A machine for use in making boxes comprising, in combination, a support for the box parts, staple forming and driving mechanism adapted to form center-pointed staples and drive the staples into the box parts, and means to cause relative progression between said mechanism and the box parts.

20. A machine for use in making boxes comprising, in combination, means to feed box parts, and staple forming and driving mechanism operable upon the box parts, including means to feed staple-stock wire, means to form a center-pointed staple, and means to drive the staple into the box parts.

21. A machine for use in making boxes comprising, in combination, means to feed box parts, and staple forming and driving mechanism adapted at each cycle of operation to form and drive into the box parts a center-pointed staple.

22. A machine for use in making boxes comprising, in combination, means to feed box parts, and a plurality of staple forming and driving mechanisms operable simultaneously to form and drive into the box parts a plurality of center-pointed staples.

23. A machine for use in making boxes comprising, in combination, means to feed box parts, and staple forming and driving mechanism operable upon the box parts including means to feed staple-stock wire, means to sever the wire, means to form the severed portion into staple form, means operable upon the wire at potential staple points prior to the severing operation to provide the staples with center points, and means to drive the staple into the box parts.

24. A machine for use in making boxes comprising, in combination, means to feed box parts, and staple forming and driving mechanism operable upon the box parts including indenting means operable upon the staple-stock wire at potential staple points to provide a center-pointed staple, means to sever the wire at potential staple points, means to feed the wire from said indenting means to the cutting means, means to bend the severed portion of the wire into staple form, and means to drive the staple into the box parts.

In testimony whereof, I have signed my name to this specification.

SERAPHINE F. BAUWENS.